United States Patent [19]
Peng et al.

[11] 3,906,663
[45] Sept. 23, 1975

[54] METHOD AND APPARATUS FOR GROWING BEAN SPROUTS AND OTHER EDIBLE SPROUTS

[76] Inventors: Ting-Fu Peng; Eng-Chin Peng, both of 6313 Fair Oaks Ave., Baltimore, Md.

[22] Filed: June 12, 1974

[21] Appl. No.: 478,578

[52] U.S. Cl. .................................................. 47/14
[51] Int. Cl.² ............................................ A01C 1/00
[58] Field of Search ................................ 47/14, 16

[56] References Cited
UNITED STATES PATENTS

| | | |
|---|---|---|
| 794,756 | 7/1905 | Bruggen ................................ 47/14 |
| 2,810,988 | 10/1957 | Chin ................................ 47/16 X |
| 2,814,912 | 12/1957 | Chew ................................ 47/16 X |
| 3,141,263 | 7/1964 | Wang ................................ 47/14 |

FOREIGN PATENTS OR APPLICATIONS

488,092 | 1/1952 | Canada ................................ 47/16

Primary Examiner—Stephen C. Pellegrino
Attorney, Agent, or Firm—Birch and Birch

[57] ABSTRACT

A self watering bean sprout growing method and kit are provided. The kit includes a water pervious growth chamber substantially submerged in a water reservoir. A foraminous grate is placed in the growth chamber and covered with a premoistened absorbent membrane over which bean seeds are spread in a layer. Provision is made for stacking alternate layers of membranes and bean or other seeds one on the other above the grate to selectively vary the quantity of each batch of bean or other edible sprouts to be propagated. The growth chamber is capped with a water pervious auxiliary reservoir whereby moisture is admitted to the growth chamber from all sides thereof. Venting of air to the growth chamber is provided between the auxiliary reservoir and the top of the growth chamber or through the walls of the growth chamber above the maximum water level in the main reservoir.

8 Claims, 8 Drawing Figures

METHOD AND APPARATUS FOR GROWING BEAN SPROUTS AND OTHER EDIBLE SPROUTS

This invention relates to means for germinating seeds and propagating sprouts therefrom and more particularly to a self-watering seed germinating and sprout propagating device for the production of edible sprouts in substantial quantities.

BACKGROUND OF THE INVENTION

Bean sprouts and other edible sprouts have long been recognized as a gourmet food not readily available to those enjoying home-grown vegetables.

In order to properly raise bean sprouts and other edible sprouts for the table, a relatively rigorous schedule of watering and attendant vigilance and inconvenience have heretofore been required in order to insure proper germination of the seeds and the ultimate propagation of healthy sprouts therefrom.

SUMMARY OF THE INVENTION

A growing chamber in the form of a pot of porous material such as fired clay is substantially submerged in a surrounding reservoir of water, the latter comprising a non-porous container such as a large cooking vessel or the like.

The growing chamber is open at the top and is adapted to receive a cover comprising a second reservoir of water in the form of a pot of porous material such as fired clay.

Within the growing chamber a foraminous support rack is placed at a position raised above the bottom of the growing chamber across substantially the entire lateral cross-section thereof.

An absorbent membrane is coextensively placed over the rack to receive a layer of seeds to be sprouted.

In one embodiment an additional absorbent membrane is placed over the layer of seeds, more seeds are spread thereon and additional layers of said membranes and seeds are stacked one upon the other to provide for the desired ultimate quantity of edible sprouts to be produced in any given growing cycle of the invention.

The top cover and reservoir is then put in place over the growing chamber and, as will be more fully described hereinafter, the bean sprouts will be produced without further attention.

The absorbent membranes are premoistened and subsequently, the water absorbed through the walls of the growing chamber from the main reservoir and bled through the walls of the upper reservoir into the growing chamber is absorbed and assimilated by the seeds resulting in the production of edible sprouts.

The raised foraminous rack provides a drain which precludes an undue collection of water around the seeds and resultant sprouts, to optimize the quality of the sprouts produced.

OBJECTS OF THE INVENTION

It is a primary object of the present invention to provide new and novel means for the home production of bean sprouts and other edible sprouts which substantially obviates the need for constant care and watering.

It is another object of the present invention to provide a new and novel self-watering edible sprout growing kit.

Another object of the present invention is to provide a new and novel method of producing substantial quantities of edible bean sprouts.

These and other objects of the present invention will become more readily apparent with reference to the following specification and drawings which relate to preferred embodiments of the present invention.

DETAILED DESCRIPTION OF THE DRAWINGS

Figure 1:
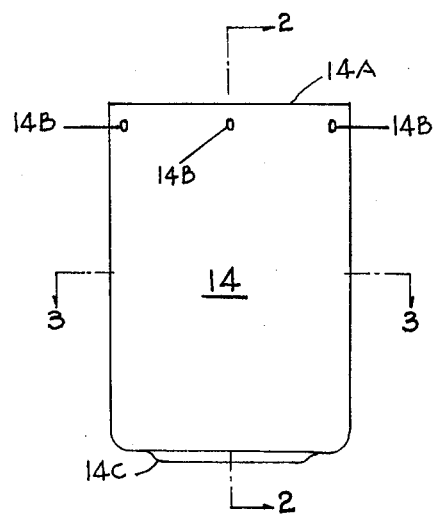
FIG. 1 is a side elevation of the growing chamber of a multi-layer sprout growing device.
Figure 2:
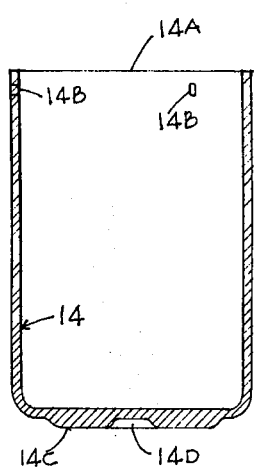
FIG. 2 is a cross-section taken along line 2—2 of FIG. 1.
Figure 3:
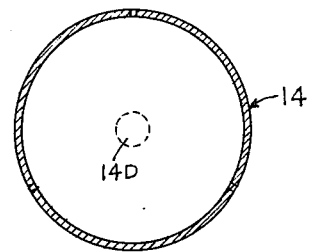
FIG. 3 is a cross-section taken along line 3—3 of FIG. 1.
Figure 4:
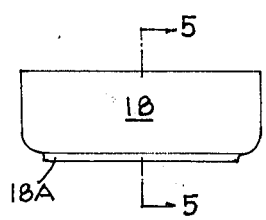
FIG. 4 is a side elevation of the growing chamber cover and upper water reservoir of the present invention.
Figure 5:
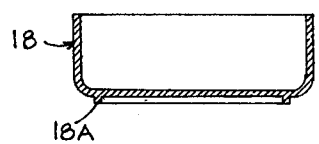
FIG. 5 is a cross-section taken along line 5—5 of FIG. 4.
Figure 6:
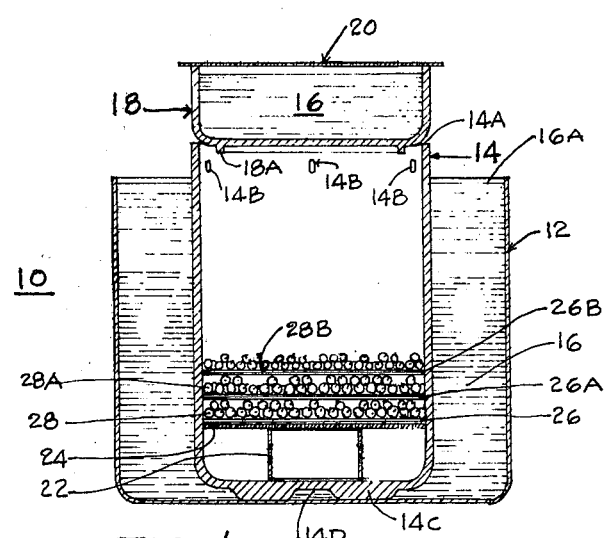
FIG. 6 is a cross-sectional view of an assembled multi-layered sprout growing kit including water reservoirs.

Referring in detail to the drawings and with particular reference to FIGS. 1–6, the edible sprout growing kit 10 of the present invention is shown as including a main reservoir 12, of a material impervious to water, open at the top end thereof and receiving within it a growing chamber 14, also open at the top.

The growing chamber 14 is slightly greater in height than the main reservoir 10 and is of a lesser transverse dimension than the latter so that when the main reservoir 12 is filled with water 16, the water level 16A cannot spill over the top rim 14A of the growing chamber 14 and a substantial volume of water 16 will surround the said growing chamber 14 within the said main reservoir 12.

The growing chamber 14 is comprised of a porous material such as fired clay or the like which is pervious to water and will permit the predictable seepage of moisture through its walls from the main reservoir 12.

Adjacent the top rim 14A of the growing chamber 14 are a plurality of air vents 14B formed through the walls of the said chamber, said air vents 14B being disposed above the maximum water line 16A of the main reservoir 14.

The base portion 14C of the growing chamber 14 has a re-entrant cavity 14D therein to permit the chamber 14 to be used as a conventional flower pot by knocking out the area subtended by the cavity 14D to form a drain.

The top rim 14A of the growing chamber 14 conformally receives the base portion 18A of an auxiliary reservoir 18 which also is filled with water 16.

In contradistinction to the impervious nature of the main reservoir 12, the auxiliary reservoir 18 is made of a porous material, such as fired clay or the like, pervious to water, to permit a predictable seepage of moisture therefrom into the growing chamber 14.

The air vents 14B prevent the effect of an air tight fit of the auxiliary reservoir 18 and top rim 14A of the growing chamber 14 which is a requisite for the growth of bean or other edible sprouts in the latter.

Figure 7:
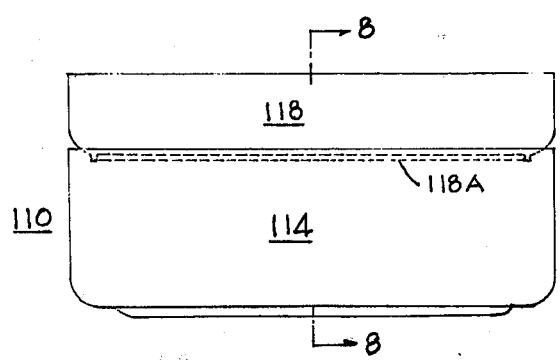
FIG. 7 is a side elevation of a single layer sprout growing kit.
Figure 8:
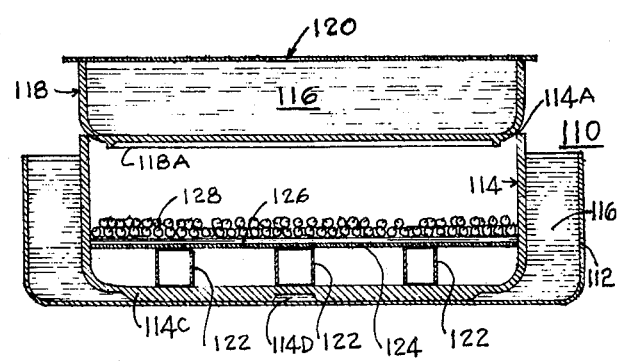
FIG. 8 is a cross-section taken along line 8—8 of FIG. 7 including the details of an outer reservoir and an upper lid for an upper reservoir.

Alternatively the air vents can be omitted as in the embodiment of FIGS. 7 and 8 so long as the top rim 14A of the growth chamber 14 and the bottom 18A of auxiliary reservoir 18 permit the venting of air therebetween.

The auxiliary reservoir 18 is open at the top and covered over by a foraminous or vented lid 20 to enhance the propensity of the water 16 in the said reservoir 18 to seep into the growth chamber 14.

In the very bottom of the growth chamber 14 is a block of pedestal 22 which supports a foraminous grating 24, the latter being substantially coextensive with the cross-section of the growing chamber 14. The block or pedestal 22 is preferably a hollow open shell to maximize the volume of the space below the foraminous grating 24.

Over the grating 24 is placed an absorbent membrane 26 substantially coextensive therewith, said membrane 26, for example, comprising paper toweling or the like.

The membrane 26 provides support for a first layer of bean or other seeds 28.

Additional alternate layers of porous membranes 26A, 26B and bean or other seeds 28A and 28B, respectively, are added to effect growth of desired quantities of bean or other edible sprouts therefrom within the growth chamber 14.

The embodiment shown in FIGS. 7 and 8 illustrates a variation in configuration of the sprout growing kit of FIGS. 1–6 and further illustrates a single layer growth chamber configuration as opposed to the multiple layer configuration of FIGS. 1–6. All like elements to those of FIGS. 1–6 bear like numerals with the prefix 100, i.e., the growing kit 110, main reservoir 112, etc.

OPERATION OF THE INVENTION

While there are several varieties of seeds which are suitable for growing edible sprouts, the mung bean is a readily available and popular variety and will be used by way of example in describing the operation of the present invention.

Initially a predetermined quantity of mung beans, such as 2.5 ounces, is rinsed in fresh water and soaked overnight in warm water.

Then, with all of the components thoroughly cleaned and washed, the following steps are followed:

The rack support 22 and foraminous rack 24 are placed in the bottom of the growth chamber;

The first absorbent membrane 26 is placed over the upper surface of the rack 24 in a premoistened state;

A layer of the presoaked bean seeds is spread over the absorbent membrane 26;

The second absorbent membrane 26A is placed over the first layer of bean seeds 28;

A second layer of bean seeds 28A is placed over the second membrane 26A;

The third absorbent membrane 26B is placed over the second layer of bean seeds 28A;

A third layer of bean seeds 28B is placed over the third membrane 26B;

The growth chamber 14 is placed within the main reservoir 12;

Fill the auxiliary reservoir 18 with water 16 and place it on top of the growth chamber 14 with the porous lid 20 in place;

Fill the main reservoir 12 with water 16; and

Place the kit, as assembled and filled, into a warm place of about 75° F.

Within 4 to 5 days the water 16 dripping into the growth chamber from the auxiliary reservoir 18 and absorbed through the walls of the growth chamber 14 from the main reservoir 12 will result in the production of bean sprouts in the amount of approximately three times the initial weight of the mung bean seeds initially placed in the growth chamber 14.

The foraminous rack 24 on its raised support or pedestal 22 acts as a drain to preclude excess water from standing in the sprouting bean seeds 28, 28A, 28B. The excess water 16 passes through the rack 24 and collects in the bottom of the growth chamber 14.

The identical operation applies for the embodiment of FIGS. 7 and 8.

As can readily be seen from the foregoing specification and drawings, this invention provides a new and novel means for growing bean or other edible sprouts in the home in an efficient and facile manner, obviating the need for constant care and attention of the seeds during the entire germinating and sprout propagating process.

It is to be understood that the various sizes, shapes and materials of the various components of the present invention may be varied so long as the requisite properties of absorbency and porosity are maintained.

We wish it to be understood that we do not desire to be limited to the exact details of construction shown and described, for obvious modifications can be made by a person skilled in the art.

We claim:

1. Self watering kit means for growing edible sprouts from seeds comprising:
    a main water reservoir comprising a container open at the top end thereof;
    a growth chamber comprising a container constructed of water pervious material situated in said main reservoir and open at its top end, said top end extending above the water level of said main reservoir;
    a foraminous grate means mounted adjacent the bottom of said growth chamber across substantially the entire transverse cross-section thereof and spaced from said bottom in the provision of a drain cavity therebetween;
    an auxiliary water reservoir comprising an open top container of water pervious material substantially closing and engaged with the top of said growth chamber and permitting the flow of air therebetween into and out of said growth chamber; and
    at least one absorbent membrane overlying and coextensively juxtaposed with said grate means for receiving a layer of seeds for sprouting.

2. The kit means of claim 1, wherein said auxiliary reservoir includes a perforate lid across the top thereof.

3. The kit means of claim 1, further including support means between said grate means and said bottom of said growth chamber determining the size of said drain cavity.

4. The kit means of claim 1 wherein said growth chamber further includes vent means adjacent the top end thereof above said maximum water level of said main reservoir.

5. The kit of claim 1, further including support means between said grate means and said bottom of said growth chamber determining the size of said drain cavity, wherein said auxiliary reservoir includes a perforate lid across the top thereof.

6. The kit means of claim 5 wherein said growth chamber further includes vent means adjacent the top end thereof above said maximum water level of said main reservoir.

7. The method of growing bean sprouts from bean seeds in a kit, wherein said kit comprises:

a main water reservoir comprising a container open at the top end thereof;

a growth chamber comprising a container constructed of pervious material situated in said main reservoir and open at its top end, said top extending above the water level of said main reservoir;

a foraminous grate means mounted adjacent the bottom of said growth chamber across substantially the entire transverse cross-section thereof and spaced from said bottom in the provision of a drain cavity therebetween;

an auxiliary water reservoir comprising an open top container of water pervious material substantially closing and engaged with the top of said growth chamber and permitting the flow of air therebetween into and out of said growth chamber; and at least one absorbent membrane overlying and coextensively juxtaposed with said grate means for receiving a layer of seeds for sprouting;

said method comprising the steps of:
a. presoaking bean seeds in warm water for a period of about 12 hours;
b. removing said auxiliary reservoir from the top of said growth chamber;
c. premoistening said absorbent membrane over said grate means;
d. spreading a layer of said bean seeds over said premoistened membrane;
e. filling said reservoirs with water;
f. placing said auxiliary reservoir on the top of said growth chamber; and
g. maintaining said kit means at a temperature of about 75°F. for 4 or 5 days.

8. The method of claim 7, including the additional step of:

placing at least one additional of said premoistened membranes over the first said layer of bean seeds with another layer of bean seeds on top of each said additional membrane in repetition of steps (c) and (d) whereby multiple layers of bean sprouts will be propagated.

* * * * *